May 8, 1962 L. I. PICKERT 3,033,580
IMPROVED LUBRICATING SWAB AND SEAL
Filed Jan. 27, 1961 2 Sheets-Sheet 1
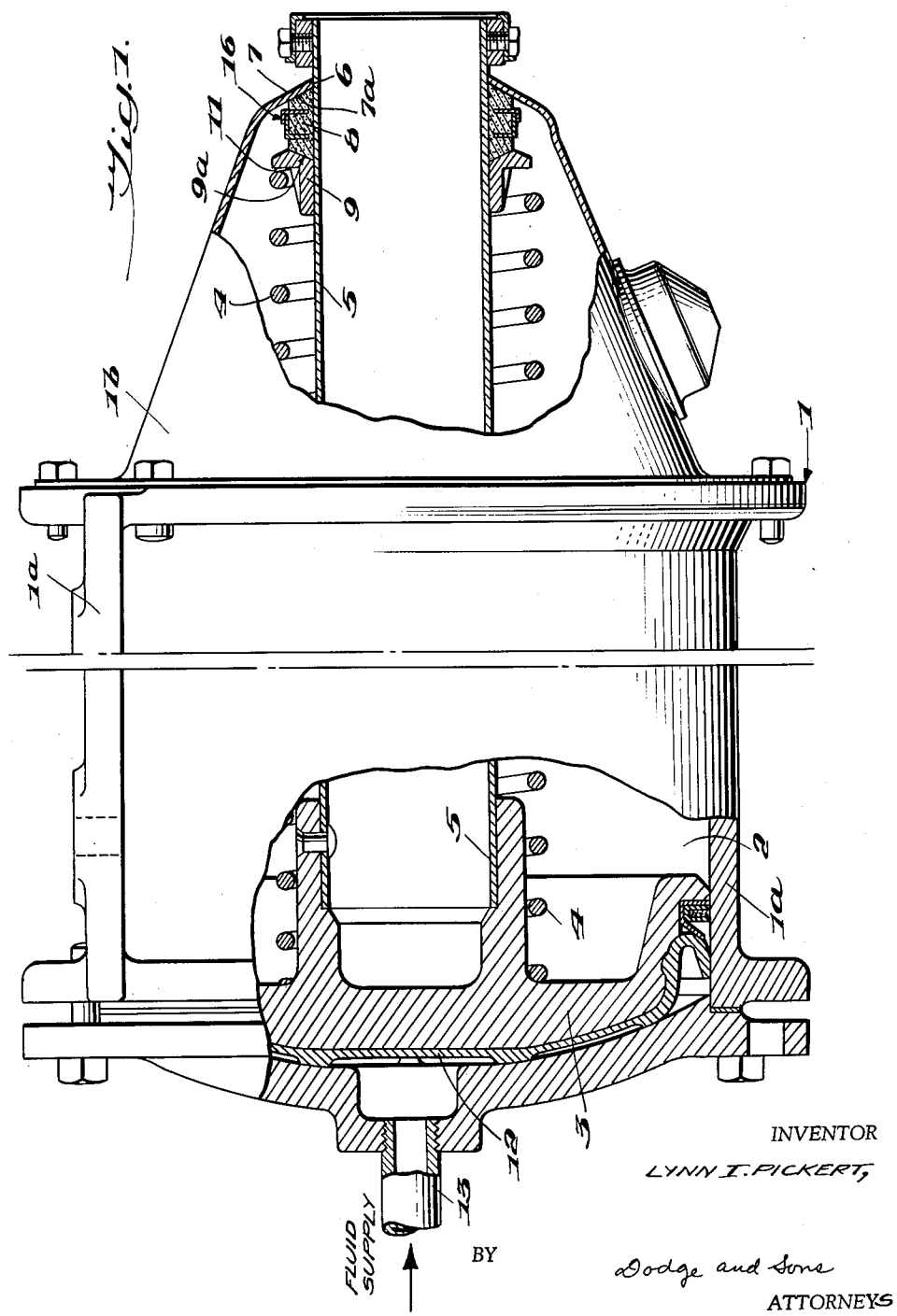
INVENTOR
LYNN I. PICKERT,
BY Dodge and Sons
ATTORNEYS

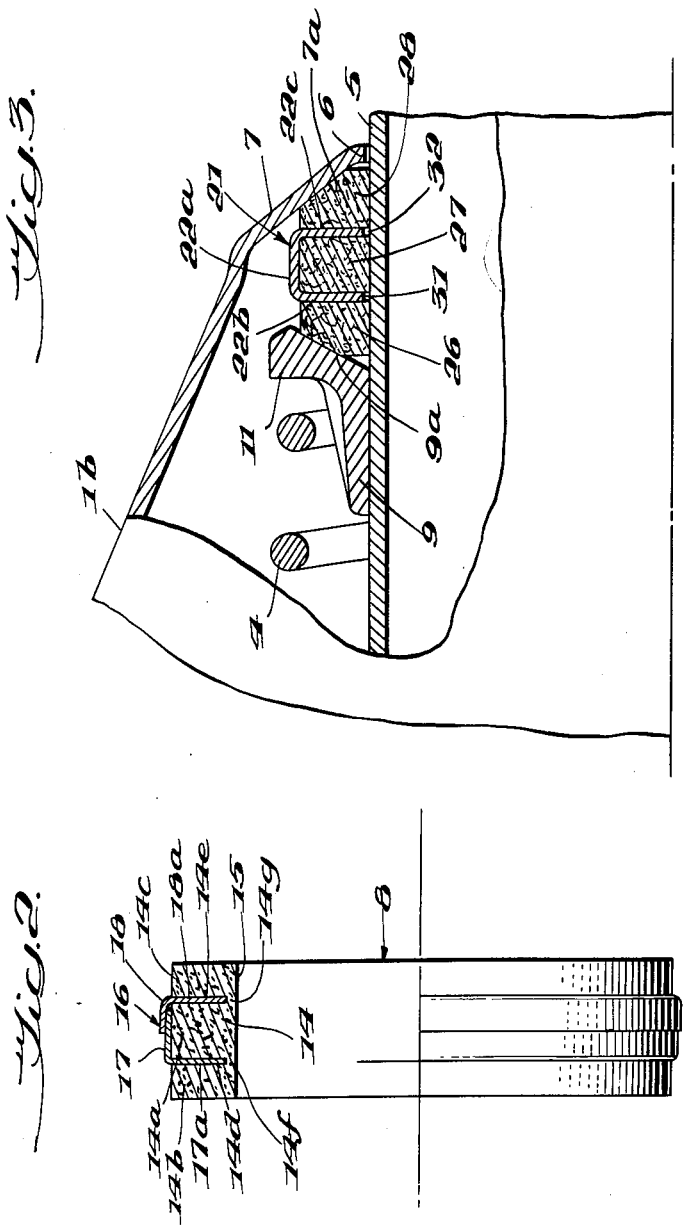

United States Patent Office 3,033,580
Patented May 8, 1962

3,033,580
IMPROVED LUBRICATING SWAB AND SEAL
Lynn I. Pickert, Watertown, N.Y., assignor to The New York Air Brake Company, a corporation of New Jersey
Filed Jan. 27, 1961, Ser. No. 85,253
11 Claims. (Cl. 277—117)

This invention relates generally to a swab for lubricating a movable machine element, and more particularly to an annular lubricating swab and seal of the longitudinally spring-biased type provided with means for preventing axial compression of a central "lubricant reservoir" portion of the swab.

Various forms of longitudinally spring-biased oil-impregnated annular lubricating swabs have been used in the past for lubricating a movable cylindrical element extending through an opening in a stationary element. The known swabs consist of an annular body of lubricant-impregnated compressible material mounted concentrically with the movable cylindrical element. Spring-biasing means are provided to urge the swab longitudinally against the stationary element to seal the space between the elements. Thus the swab body is compressed axially over its entire length. Such swabs present the major drawback that, because of the axial compression, the lubricant is squeezed out of the absorbent swab body at a relatively high flow rate with the result that they have relatively short lives and equipment using them requires frequent servicing and maintenance.

The object of the present invention is to provide an improved lubricating swab and seal which includes a compressible lubricant-impregnated annular swab body having a pair of annular freely-compressible end portions and an annular central "lubricant reservoir" portion intermediate the end portions. The invention is characterized by the provision of a reservoir protecting member for preventing axial compression of the central reservoir portion when compressive forces are applied to the ends of the swab body. By avoiding axial compression of this central portion, the rate at which the lubricant is fed from the reservoir is reduced and the operational life of the swab is greatly lengthened.

The reservoir protecting member comprises a pair of axially-spaced rigid annular planar members extending radially partially through the swab body at opposite ends of the central reservoir portion thereof, in combination with axially-incompressible means positioned intermediate the planar members for preventing the members from moving toward each other. The protecting member may be of unitary construction consisting of a cylindrical sleeve portion having radially inward-directed flanges at each end thereof, or it may be sectional.

The annular swab body may be of unitary construction having a pair of axially-spaced circumferential grooves in its outer periphery defining a central reservoir portion between a pair of end portions and connected therewith by a pair of annular bridging connections adjacent the inner periphery of the body, or the swab body may consist of three separate annular sections arranged coaxially end to end.

While the lubricating swab and seal of the present invention is suitable for use in numerous applicatoins and on various types of apparatus, the improved swab, due to its increased operational life characteristics, is particularly advantageous for use in air brake mechanisms applied to railway rolling stock. In the railroad industry, it is the practice to route trains through marshalling yards at various points in the country where the cars are redistributed in accordance with the destinations of the loads. While the marshalling yards provide limited inspection and maintenance facilities for the rolling stock, usually it is not until the equipment passes through its home terminal during normal load routing that it is given especially careful inspection and periodic overhauling. Since it is not uncommon for rolling stock to be subjected to substantially continuous use for extended periods of time under various adverse weather and handling conditions, it is imperative that the elements of the air brake and other rolling stock mechanisms be designed for reliable operation over long periods of time. In view of the extended operational life afforded by the simple, durable and inexpensive lubricating swab of the present invention, air brakes using the swab require less servicing. During overhauling of the air brake, the additional advantage is presented that the swab may be easily and quickly replaced without requiring special tools or skilled labor.

Other objects and advantages of the invention will become apparent from a study of the following description when considered in conjunction with the accompanying drawings, in which:

FIG. 1 is an elevation, partly in section, of a conventional air brake cylinder mechanism utilizing the preferred embodiment of longitudinally spring-biased lubricating swab.

FIG. 2 is an elevation, partly in section, of the preferred lubricating swab embodiment.

FIG. 3 is detailed view, partly in section, showing of a portion of a conventional air brake cylinder mechanism utilizing a second embodiment of the present invention.

Referring first to FIG. 1, a conventional air brake cylinder is shown and includes a housing 1 having separable housing sections 1a, 1b bolted together as shown. Housing section 1a is provided with a longitudinal bore 2 which forms the cylinder of a fluid-pressure motor. Piston 3 is mounted for reciprocation in the cylinder and is movable to the right against the counteracting biasing force of heavy coil spring 4 by the application of fluid pressure to the left-hand surface of piston 3. Secured at one end to the piston 3 and concentrically arranged within the spring 4 is the tubular piston rod 5. Piston rod 5 extends axially through an opening 6 in the end portion 7 of housing section 1b for sliding movement relatively thereto as the piston 3 reciprocates in the cylinder.

Concentrically mounted on the piston rod 5 adjacent the opening 6 is an annular lubricating swab 8. Also mounted concentrically on the piston rod 5 is the combined spring seat and swab retainer sleeve 9 having a radial flange 11 against which spring 4 seats. The right-hand end of sleeve 9 is chamfered adjacent the inner periphery of the sleeve to form the truncated conical end wall surface portion 9a opposite a corresponding truncated conical wall surface 7a of the housing end portion 7. Spring 4 is preloaded so that, in the absence of pressure fluid in the working chamber 12 of the pressure motor, spring 4 reacts intermediate piston 3 and flange 11 to urge piston 3 to the left against the end wall of the cylinder and to urge spring retainer 9 to the right to press lubricating swab 8 into tight sealing engagement with the housing end wall. The lubricating swab 8 is axially compressed intermediate the chamfered end wall surface portion 9a of the spring retainer and the truncated conical inner wall surface 7a of the housing end portion 7. The opening 6 is thus sealed by the lubricating swab 8 to prevent dust and dirt particles and other contaminants from entering the non-pressure head of the cylinder.

The retainer sleeve 9 and the lubricating swab 8 constitute a stationary unit for guiding the right-hand end of the piston rod 5 as the piston rod assembly reciprocates in the housng 1 during operation of the fluid pressure motor. Pressure fluid is supplied to and exhausted from the working chamber 12 by way of conduit 13.

Referring now to FIG. 2, the annular lubricating swab 8 includes a swab body 14 formed of an absorbent compressible material (such as felt) which is impregnated with a lubricant (such as lubricating oil), and the swab body has an inner peripheral surface 15 contacting the outer periphery of the piston rod 5 for applying lubricant thereto during its reciprocatory movement.

As shown in FIGS. 1 and 2, means are provided for preventing axial compression of a central "lubricant reservoir" portion 14a of the swab body when the swab is axially compressed between the spring retainer surface 9a and the housing end wall surface 7a. The central reservoir portion 14a lies between a pair of axially-spaced end portions 14b, 14c and is separated therefrom by a pair of radial grooves 14d and 14e extending inward from the outer periphery of the swab body. Each of the grooves extends radially inward partially through the swab body and terminates near the inner peripheral surface 15 so that the end portions 14b, 14c are connected to the reservoir portion 14a by bridging connection portions 14f, 14g.

The reservoir portion 14a is encircled by an axially-incompressible reservoir protecting member 16 consisting of a pair of telescopically-arranged rigid sleeves 17, 18, preferably formed of a relatively hard metal, such as steel. The outer sleeve 18 is provided at one end with a continuous radially inward-directed rigid flange 18a which extends into groove 14e. The inner sleeve 17 is provided at the end remote from flange 18a with a continuous radially inward-directed rigid flange 17a which extends into groove 14d. The unflanged end of the inner cylindrical sleeve 17 abuts against the flange 18a of the sleeve 18. Consequently the inner cylindrical sleeve 17 limits the movement of flanges 17a and 18a toward each other, thereby protecting the reservoir portion 14a against compression.

To assemble the swab, the housing section 1b is removed from the housing section 1a and the spring retainer sleeve 9 and the lubricating swab 8 are slid onto the piston rod 5, the right-hand end of spring 4 seating against the flange 11. Since the lubricating swab is symmetrical in construction, it is reversible and therefore it is immaterial which end engages the spring retainer sleeve 9. The piston rod 5 is then inserted through the opening 6 of housing end portion 1b and the two housing portions 1a, 1b are bolted together to compress spring 4 with the desired amount of preloading. The preloaded spring 4 reacts between the piston 3 and the spring retainer flange 11 to urge piston 3 to the left against the end wall of the cylinder and to urge spring retainer 9 to the right. A longitudinally-directed compressive force is thus applied to the lubricating swab 8 by the action of spring 4 on spring retainer 9, with the result that the end portions 14b and 14c of the swab body are axially compressed between the chamfered wall surface portion 9a of the spring retainer and the truncated conical internal wall surface 7a of the housing end portion 7. However, due to the presence of the protecting member 16, axial compression of the central reservoir portion 14a is prevented by the sleeve elements 17 and 18 and the flanges 17a and 18a.

Because of the configurations of the chamfered surface 9a and the internal surface 7a of the conical end wall portion 7, the swab body end portions 14b, 14c will be deformed and compressed to a greater degree at their outer peripheral portions than at their inner peripheral portions, as shown in FIG. 1. The axial compressive forces applied to the end portions 14b, 14c will be transmitted both radially inward and axially toward the bridging portions 14f, 14g to effect a certain degree of compression of the same, whereby the flow of the lubricant from the reservoir portion 14a to the end portions 14b, 14c will be restricted to a certain extent. The rate of oil loss from the reservoir to the exposed peripheral surface of the piston rod will thus be reduced. Since the lubricant-impregnated reservoir portion 14a of the swab body is not compressed by the axial compressive forces developed by the spring 4, the lubricant will be retained in the reservoir portion for a relatively long period of time under all conditions of weather and usage, and the number of brake cylinder servicing operations required during a given period of time is greatly reduced.

Referring now to FIG. 3, a second lubricating swab embodiment is illustrated. Like the FIG. 2 embodiment, it is intended for use in lubricating the piston rod of the conventional brake cylinder apparatus shown in FIG. 1, identical parts in the two figures being identified by the same reference numerals. This lubricating swab embodiment includes an annular reservoir protecting member 21 of rigid unitary construction consisting of an axially-incompressible longitudinally-extending cylindrical portion 22a having radially inward-directed rigid flange portions 22b and 22c at each end thereof. The swab body comprises three coaxially-arranged separate cylindrical sections 26, 27 and 28 each consisting of a soft compressible absorbent material, such as felt, impregnated with a lubricant, such as lubricating oil. The central section 27 of the swab body constitutes a lubricant reservoir portion and is interposed between the rigid radial flange portions 22b and 22c of the protecting member. These flange portions prevent the central section from being axially compressed when longitudinal compressive forces are applied to the swab body by the action of preloaded spring 4 on the retainer sleeve 9. Each of the radial flanges 22b, 22c extends inward partially through the swab body and is radially-spaced at its inner circumference a small distance from the outer periphery of the piston rod, whereby spaces 31 and 32 are provided adjacent the inner periphery of the swab body for permitting the passage of lubricant from the reservoir section 27 to the end sections 26, 28.

When the brake cylinder is in the assembled condition illustrated in FIG. 3, biasing spring 4 reacts between the piston and the retainer sleeve 9 to urge the latter to the right to press lubricating swab 21 against the housing end portion 7. The end sections 26 and 28 of the swab body are axially compressed due to the longitudinal biasing force developed by the spring 4, the deformation of the end sections being greater at their outer peripheral portions than at their inner peripheral portions due to the configurations of the spring retainer chamfered wall surface 9a and the truncated conical inner wall surface 7a of the housing end portion 7. Because of the provision of the reservoir protecting member 21, the axial compressive forces applied to the end sections 26, 28 will not be transmitted to the central reservoir portion 27 and consequently the latter will remain in its uncompressed condition.

The swab body sections are in contiguous rubbing engagement with the outer periphery of the piston rod and apply lubricant to the same as the rod reciprocates in the housing opening relatively to the stationary spring-biased retainer sleeve and swab unit. Since axial compression of the central reservoir section 27 is avoided, the rate at which the lubricant flows out of the reservoir section is lower than the rate at which the lubricant is squeezed out of the compressed end sections 26, 28 whereby the operational life of the swab is increased. The central reservoir section also serves to replenish the lubricant in the inner peripheral portions of the end sections through the passages 31, 32 since these inner peripheral portions are under less compression than the outer peripheral portions of the end sections.

While in accordance with the provisions of the patent statutes, I have illustrated and described the best forms and embodiments of the invention now known to me, it will be apparent to those skilled in the art that other changes may be made in the described lubricating swabs without deviating from the invention as set forth in the following claims:

What is claimed is:

1. A lubricating swab comprising an annular swab body of compressible absorbent material adapted to be impregnated with a lubricant, said body having a pair of axially-spaced annular end portions and an annular reservoir portion intermediate said end portions; and reservoir protecting means for preventing compression of said reservoir portion when axially-directed compressive forces are applied to the ends of said swab body, said protecting means comprising a pair of axially-spaced rigid annular planar members each of which is arranged at opposite ends of said reservoir portion transversely of the longitudinal axis of said swab body, each of said members extending radially partially through said swab body from one peripheral surface toward the other peripheral surface thereof, and axially-incompressible means intermediate said planar members preventing movement of said members in the axial direction toward each other.

2. Apparatus as defined in claim 1 wherein said axially-incompressible means comprises a pair of telescopically-arranged rigid cylindrical sleeves concentrically mounted about the outer periphery of said reservoir portion, and further wherein said annular planar members comprise radially inward-directed flanges rigidly connected respectively to oposite ends of said cylindrical sleeves, the innermost one of said sleeves being in abutting engagement at one end with the flange secured to the end of the other of said sleeves, whereby relative axial movement of said sleeves in a direction tending to move said flanges toward each other is prevented.

3. Apparatus as defined in claim 1 wherein said swab body is of unitary construction and contains in its outer peripheral surface a pair of axially-spaced continuous radial grooves, said grooves lying in planes normal to the longitudinal axis of said swab body at opposite ends of said reservoir portion, said annular planar members being received in said grooves.

4. Apparatus as defined in claim 1 wherein said axially-incompressible means comprises a rigid cylindrical sleeve concentrically mounted about the outer periphery of said reservoir portion, and further wherein said annular planar members comprise radially inward-directed flanges connected with the ends of said sleeve.

5. Apparatus as defined in claim 1 wherein said swab body consists of three separate annular sections arranged coaxially end to end, said annular planar members extending inward between successive annular sections.

6. A lubricating swab comprising an annular swab body of compressible, absorbent material adapted to be impregnated with lubricant, said body including a pair of axially spaced end portions and a central reservoir portion; rigid separators, one between each end portion and the corresponding end of the reservoir portion, the inner margin of each separator being within the swab body; and means reacting between the separators and preventing axial movement of the separators toward one another.

7. Apparatus as defined in claim 6 in which the means comprises a sleeve formed as an integral part of one of the separators and abutting against the other.

8. The combination defined in claim 7; and a second sleeve encircling the first and formed as an integral part of said other separator.

9. The combination defined in claim 6 and connecting elements extending along the inner periphery of the swab body and interconnecting said portions.

10. The combination defined in claim 6 in which said means comprises a sleeve encircling said central portion, the separators being formed as integral parts of said sleeve.

11. The combination of a housing having a wall with an opening therein; a reciprocable element extending through said opening; an annular swab body of compressible, lubricant-impregnated material encircling said element; yielding means biasing said swab body toward said wall, said swab body having at least two coaxial portions arranged end to end; and means preventing compression of one of said portions by said yielding means.

References Cited in the file of this patent
UNITED STATES PATENTS

| | | |
|---|---|---|
| 546,106 | Schmaltz | Sept. 10, 1895 |
| 706,536 | Dougan et al. | Aug. 12, 1902 |
| 897,448 | Blake | Sept. 1, 1908 |
| 1,552,876 | Paxton | Sept. 8, 1925 |
| 1,670,368 | MacPherson | May 22, 1928 |
| 2,020,122 | Padgett | Nov. 5, 1935 |
| 2,170,134 | Flick | Aug. 22, 1939 |
| 2,383,241 | Down | Aug. 21, 1945 |
| 2,445,410 | Smith | July 20, 1948 |
| 2,728,592 | Vorech | Dec. 27, 1955 |